(12) United States Patent
Morris

(10) Patent No.: US 7,672,248 B2
(45) Date of Patent: Mar. 2, 2010

(54) METHODS, SYSTEMS, AND COMPUTER PROGRAM PRODUCTS FOR AUTOMATICALLY CHANGING NETWORK COMMUNICATION CONFIGURATION INFORMATION WHEN A COMMUNICATION SESSION IS TERMINATED

(75) Inventor: Robert Paul Morris, Raleigh, NC (US)

(73) Assignee: Scenera Technologies, LLC, Portsmouth, NH (US)

( * ) Notice: Subject to any disclaimer, the term of this patent is extended or adjusted under 35 U.S.C. 154(b) by 793 days.

(21) Appl. No.: 11/451,746

(22) Filed: Jun. 13, 2006

(65) Prior Publication Data

US 2007/0286215 A1    Dec. 13, 2007

(51) Int. Cl.
*H04L 12/56* (2006.01)
*H04J 1/16* (2006.01)

(52) U.S. Cl. ................ 370/252; 370/254; 370/338; 370/431

(58) Field of Classification Search .......... 370/389, 370/252, 278, 254, 338, 431
See application file for complete search history.

(56) References Cited

U.S. PATENT DOCUMENTS

| 5,991,287 | A * | 11/1999 | Diepstraten et al. ......... 370/338 |
| 6,463,473 | B1 | 10/2002 | Gubbi |
| 6,873,615 | B2 | 3/2005 | Ratzel |
| 7,124,184 | B2 * | 10/2006 | Chung et al. ............... 709/224 |
| 2001/0043598 | A1 * | 11/2001 | Brabenac ................... 370/389 |
| 2003/0098778 | A1 | 5/2003 | Taylor et al. |
| 2003/0198196 | A1 * | 10/2003 | Bahl et al. .................. 370/311 |
| 2003/0212802 | A1 | 11/2003 | Rector et al. |
| 2004/0051664 | A1 | 3/2004 | Frank |
| 2004/0098487 | A1 | 5/2004 | Miller et al. |
| 2004/0264395 | A1 | 12/2004 | Rao |
| 2005/0083907 | A1 * | 4/2005 | Fishler ....................... 370/352 |
| 2005/0114341 | A1 * | 5/2005 | Droms ........................ 707/10 |
| 2005/0226175 | A1 | 10/2005 | Gupta et al. |
| 2006/0136570 | A1 * | 6/2006 | Pandya ....................... 709/217 |
| 2007/0251997 | A1 * | 11/2007 | Brown et al. ................ 235/380 |

FOREIGN PATENT DOCUMENTS

| WO | WO 2004/014040 | 2/2004 |
| WO | WO 2006/008695 | 1/2006 |

OTHER PUBLICATIONS

Moran, "A Convenient Way to Secure Your Wireless Network," Small Business Computing.com, pp. 1-4 (Jan. 20, 2006).
Lee et al., "Guest Access: Change Even Your Mother into an Effective Security Technician," IEEE CCNC, pp. 442-447 (2006).

(Continued)

*Primary Examiner*—John Pezzlo

(57) ABSTRACT

A network host device is enabled to initiate providing of network communication configuration information for a network to at least one network-enabled device for establishing a communication session via the network. It is determined when a last communication session is terminated of a last one of the at least one network-enable device. In response to determining when the last communication session is terminated, the network host device is disabled from providing the network communication configuration information. In response to determining when the last communication session is terminated, the network communication configuration information for the network is automatically changed.

30 Claims, 4 Drawing Sheets

OTHER PUBLICATIONS

Cheung et al., "One Touch" Wireless Security—Buffalo Technology's AOSS vs. Linksys' SecureEasySetup, pp. 1-13 (Jun. 22, 2005).

Asokan et al., "Visitor Access Management in Personal Wireless Networks," IEEE International Symposium on Multimedia (ISM'05), pp. 1-8 (2005).

"AirStation One-Touch Secure System (AOSS™)," Buffalo Technology (USA), Inc., pp. 1-7 (Oct. 2004).

"Wireless-G Media Storage Link Router with SpeedBooster," User Guide, Linksys®, Cisco Systems, 95 pages (Publication Date Unknown).

* cited by examiner

METHODS, SYSTEMS, AND COMPUTER PROGRAM PRODUCTS FOR AUTOMATICALLY CHANGING NETWORK COMMUNICATION CONFIGURATION INFORMATION WHEN A COMMUNICATION SESSION IS TERMINATED

TECHNICAL FIELD

The subject matter described herein relates to changing network communication configuration information. More particularly, the subject matter described herein relates to methods, systems, and computer program products for automatically changing network communication configuration information when a communication session is terminated.

BACKGROUND

Users of network-enabled devices often require network access to communicate and exchange data with other network-enabled devices, network resources, and/or the Internet. Network-enabled devices include computers, mobile phones, and personal digital assistants (PDAs). A network host device can establish a communication session between a network and a network-enabled device to provide connectivity for the network-enabled device. Network host devices include wireless access points (WAPs), wireless network base stations, switches, and hubs.

Typically, access to a network via a network host device requires that a network-enabled device provide network communication configuration information to the network host device. Examples of network communication configuration information include a service set identifier (SSID) and network keys. The network communication configuration information must be distributed to the network host device or to a user of the network host device in order for the user to be able to access the network. The distribution of communication configuration information should be controlled because the information may be readily passed to unauthorized network-enabled devices. Therefore, it is desirable to provide secure techniques for handling network communication configuration information.

One technique for providing secure network communication configuration information involves manually entering changed configuration information after access by guest network-enabled devices is terminated. This technique requires that an operator manually change the configuration information. Thus, this technique is subject to human error because an operator must remember to manually change the configuration information after access for a guest terminates.

Another technique for providing secure network communication configuration information involves providing instructions to a network host device and a network-enabled device to enter a configuration mode. After providing the indicators, the network host device and network-enabled device attempt to communicate using an unsecure connection. If the connection is successful, the network host device generates an SSID and network keys and communicates configuration information including the SSID and the network keys to the network-enabled device. The network host device and network-enabled device may reboot and connect using the communicated configuration information.

This technique requires that an operator be in close proximity to the device to manually press a reset button to change the configuration information. Thus, this technique is subject to human error because an operator must remember to manually change the configuration information after a network access for a guest is terminated.

Accordingly, in light of the above described difficulties and needs associated with existing techniques for changing network communication configuration information, there exists a need for improved methods, systems, and computer program products for automatically changing network communication configuration information when a communication session is terminated.

SUMMARY

According to one aspect, the subject matter described herein includes methods, systems, and computer program products for automatically changing network communication configuration information when a communication session is terminated. One method enables a network host device to initiate providing of network communication configuration information for a network to at least one network-enabled device for establishing a communication session via the network. It is determined when a last communication session is terminated of a last one of the at least one network-enable device. In response to determining when the last communication session is terminated, the network host device is disabled from providing the network communication configuration information. In response to determining when the last communication session is terminated, the network communication configuration information for the network is automatically changed.

The subject matter described herein may be implemented using a computer program product comprising computer executable instructions embodied in a computer-readable medium. Exemplary computer-readable media suitable for implementing the subject matter described herein include chip memory devices, disk memory devices, programmable logic devices, application specific integrated circuits, and downloadable electrical signals. In addition, a computer-readable medium that implements the subject matter described herein may be distributed as represented by multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 1:
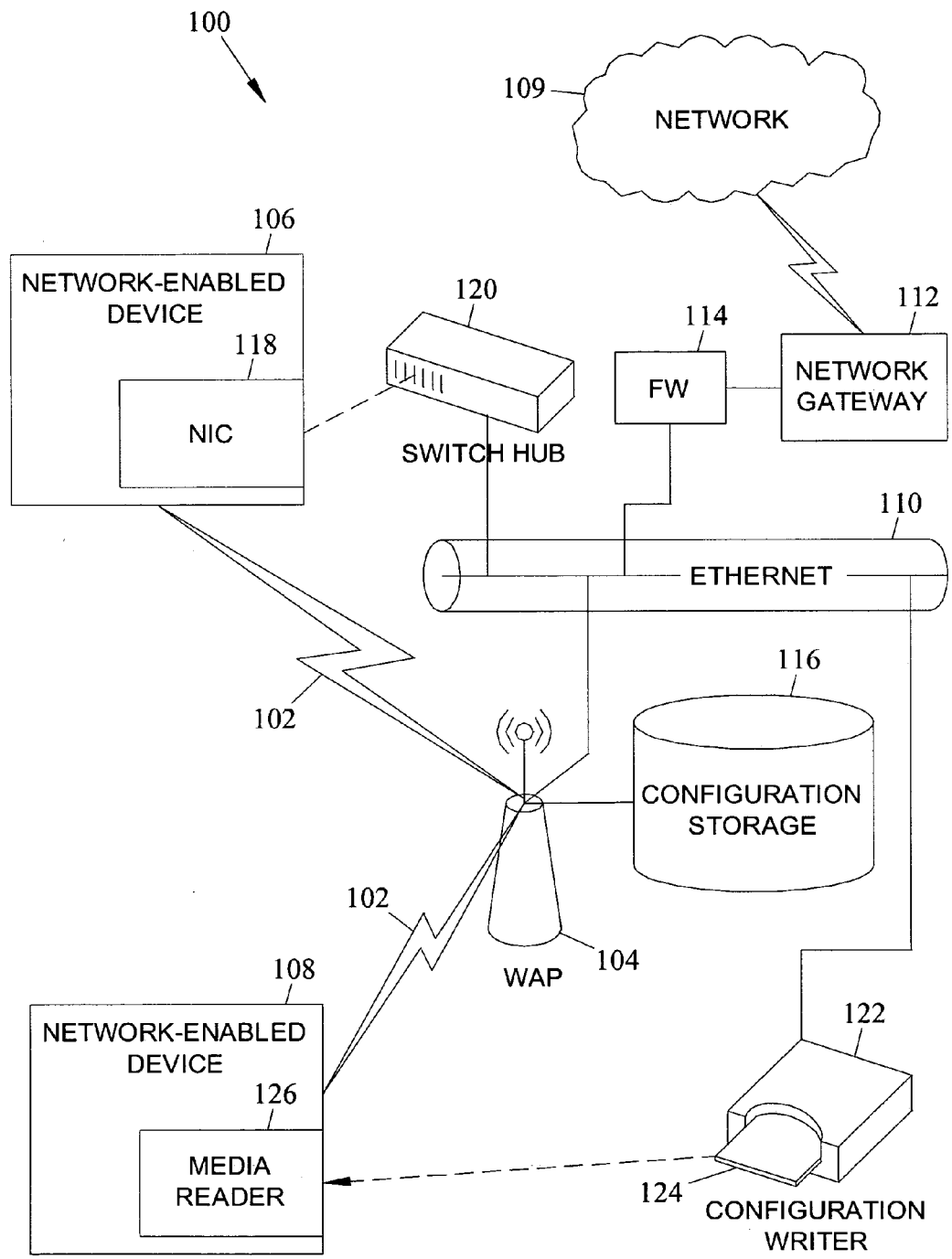
FIG. 1 is a block diagram of an exemplary system comprising a network connected to a network host device according to an embodiment of the subject matter described herein.

The subject matter described herein includes methods, systems, and computer program products for automatically changing network communication configuration information when a communication session is terminated. According to one aspect, a system according to the subject matter described herein may be implemented as hardware, software, and/or firmware components executing on one or more components of a network including a network host device configured to provide network communication to one or more network-enabled devices. FIG. 1 is a block diagram of an exemplary system 100 comprising a wireless network 102 that includes a network host device 104. Wireless network 102 may be part of any suitable type of network, such as a local area network (LAN) or a wide area network (WAN). In this example, network host device 104 is a WAP supporting connectivity via wireless network 102. Device 104 may be any type of network host device configured to support a network communication session via a network, such as wireless network 102, by providing network communication configuration information to one or more network-enabled devices. For example, device 104 may be configured to provide network-enabled devices 106 and 108 with network communication configuration information and support communication sessions via wireless network 102. Connectivity may also be provided for communication on a second network 109. For example, communication on network 109 may be provided via wireless network 102 of device 104 through Ethernet 110 and a network gateway 112. A network firewall device 114 may be provided between Ethernet 110 and gateway 112 for providing network security and for isolating a network-enabled device from network 102 or otherwise for restricting access to host access resources. Although not shown in FIG. 1, wireless network 102 may be connected to any other suitable type or number of network host devices configured to provide wireless and/or wired network communication sessions to one or more network-enabled devices and to provide associated network communication configuration information according to the subject matter described herein.

As used herein, a "network-enabled device" refers to any suitable device configured to communicate with a network. For example, a network-enabled device may be configured to establish a communication session with a network via a network host device by providing network communication configuration information to the network host device. Exemplary network-enabled devices include a mobile phone, a PDA, a media capture device, a projector, a display device, a media player device, a sensor device, an appliance, a transportation device, and a computer. Some network-enabled devices may be previously unknown to the network and require the provision of network communication configuration information to access the network. Other network-enabled devices may be known to a network when providing authentication information, authorization information, and/or policy information to the network and/or a network host device.

A communication session between a network and a network-enabled device may be established, for example, by enabling a network host device 104 to initiate providing of network communication configuration information for wireless network 102 to a network-enabled device. The network communication configuration information may be used by one or more network-enabled devices for each establishing a communication session via wireless network 102 supported by network host device 104. For example, network-enabled device 106 may be provided with network communication configuration information for establishing a communication session via wireless network 102 via WAP 104. A plurality of network-enabled devices may simultaneously conduct communication sessions via a network via a communicatively coupled host device. The same network communication configuration information may be used for each of the network-enabled devices that are simultaneously conducting communication sessions via the network or may be tailored for each or some of the devices.

Current network communication configuration information may be stored at a configuration storage 116 accessible by WAP 104. The configuration information may be communicated to a network-enabled device via wireless communication such as a proximity network, a wired connection, a display device, an audio device, and/or a computer read/write medium. For example, the configuration information may be wirelessly communicated to network-enabled devices 106 and 108 via WAP 104 using RF or an infrared proximity network. A configuration protocol such as SecureEasySetup (SES) or AirStation One Touch Secure System (AOSS) may be used to communicate the information. In another example, the configuration information for WAP 104 may be communicated via a wired network interface card (NIC) 118 of network-enabled device 106. In this example, NIC 118 may be connected to a switch/hub 120 and configuration information is communicated from WAP 104 via Ethernet 110 and switch/hub 120. In an alternate embodiment, NIC 118 may be connected to a port integrated with WAP 104. In another example, configuration information may be communicated from WAP 104 to a configuration writer 122 via Ethernet 110. In this example, configuration writer 122 may write the configuration information to a computer read/write medium 124, such as a computer disk, compact disc (CD), or a memory key. Further, in this example, medium 124 may be accessed by a media reader 126 of network-enabled device 108 and the configuration information read from medium 124 for use by device 108. In an alternate embodiment, communication writer 122 may be directly coupled with WAP 104. In yet another embodiment, WAP 104 may provide configuration information via a communicatively coupled presentation device such as a display or an audio player allowing a user to see and/or hear the configuration information and/or allowing the user to enter the information to a network-enabled device.

As used herein, "network communication configuration information" refers to any suitable information for configuring a communication session between a network and one or more network-enabled devices. For example, communication configuration information may be an SSID. The SSID may be a unique identifier attached to a header of packets sent over a network, such as a wireless LAN, that acts as a network identifier when network-enabled device tries to connect to a network host device. The SSID may differentiate one network from another, so network host devices and devices attempting to connect to a specific network may use the same SSID. A device may not be permitted to join the network host device unless it can provide the SSID.

Network communication configuration information may also include a shared key which serves as a passphrase provided by a network-enabled device to a network host device for authorizing access to the network by the network host device for the network-enabled device. Exemplary systems or environments that utilize network keys include the Wi-Fi protected access (WPA and WPA2) system and the wired equivalent privacy (WEP) system.

Configuration information used by a network-enabled device to gain access to a network differs according to the network type and the security technologies used to protect access to the network. For most WiFi networks, an SSID and pre-shared key may be used. For networks protected by a Radius server, for example, a userid and password may be used. Some networks use a client certificate signed by a recognized and trusted certificate authority (CA). After access is authorized, additional configuration may be provided over the network such as an IP address for the network-enabled device provided by a DHCP service. If a fixed IP address is required for some reason, it may be included in the configuration information provided to the device prior to gaining access.

A network host device may automatically change network communication configuration information for a network, such as for wireless network 102, when a communication session between the network and a network-enabled device is terminated. In particular, a network host device may determine whether a last session terminates of a last one of a plurality of network-enabled devices. A session may be terminated as a result of an action taken by a network-enabled device and/or the network host, or a session may terminate as a result of an error or loss of communication due to external factor such as a break in a wired line or interference affecting a wireless link. When it is determined that the last communication session of the last one of the network-enabled devices has terminated, the network host device may be disabled from providing network communication configuration information for wireless network 102. Further, when it is determined that the last communication session of the last one of the network-enabled devices has been terminated, the network communication configuration information for wireless network 102 may be automatically changed. For example, a new SSID and/or shared keys may be generated without intervention by an administrator when the last communication session with the network via the network host device is terminated. The feature of automatically changing the network communication configuration information for a network can be beneficial, because a network host device administrator will not have to manually change the network communication configuration information.

In one exemplary implementation, WAP 104 may automatically change network communication configuration information for wireless network 102 when a last communication session between wireless network 102 and a network-enabled device hosted by WAP 104 is terminated. For example, WAP 104 may host wireless communication sessions between network-enabled devices 106 and 108. Devices 106 and 108 may each be provided with network communication configuration information for establishing respective communication sessions via wireless network 102 via WAP 104. WAP 104 may determine whether a last session of a last one of devices 106 and 108 is terminated. In response to determining that the last session of the last one of devices 106 and 108 is terminated, WAP 104 may be disabled from providing network communication configuration information for wireless network 102. Further, in response to determining that the last session is terminated of the last one of devices 106 and 108, WAP 104 may automatically change the network communication configuration information for wireless network 102. The new network communication configuration information may be used for establishing subsequent communication sessions with wireless network 102 via WAP 104.

Figure 2:
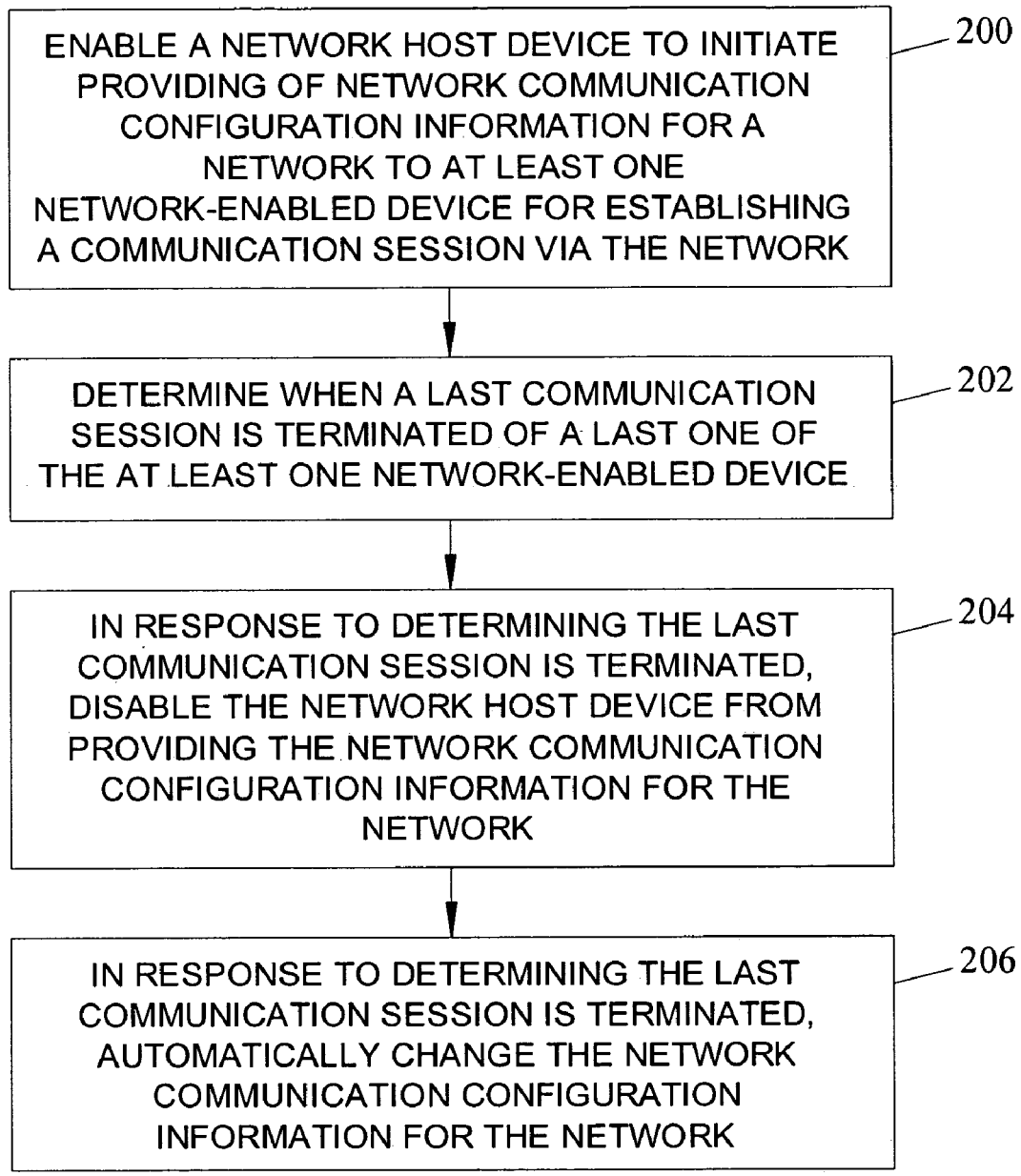
FIG. 2 is a flow chart of an exemplary process for automatically changing network communication configuration information when a communication session is terminated according to an embodiment of the subject matter described herein.

FIG. 2 is a flow chart illustrating an exemplary process for automatically changing network communication configuration information when a communication session is terminated according to an embodiment of the subject matter described herein. Referring to FIG. 2, in block 200 a network host device is enabled to initiate providing of network communication configuration information for a network to at least one network-enabled device for establishing a communication session. In block 202, it is determined when a last communication session is terminated of a last one of the at least one network-enabled device. In response to determining the last communication session is terminated, the network host device is disabled from providing the network communication configuration information (block 204). Further, in response to determining the last communication session is terminated, the network communication configuration information is automatically changed for the network (block 206).

Figure 3:
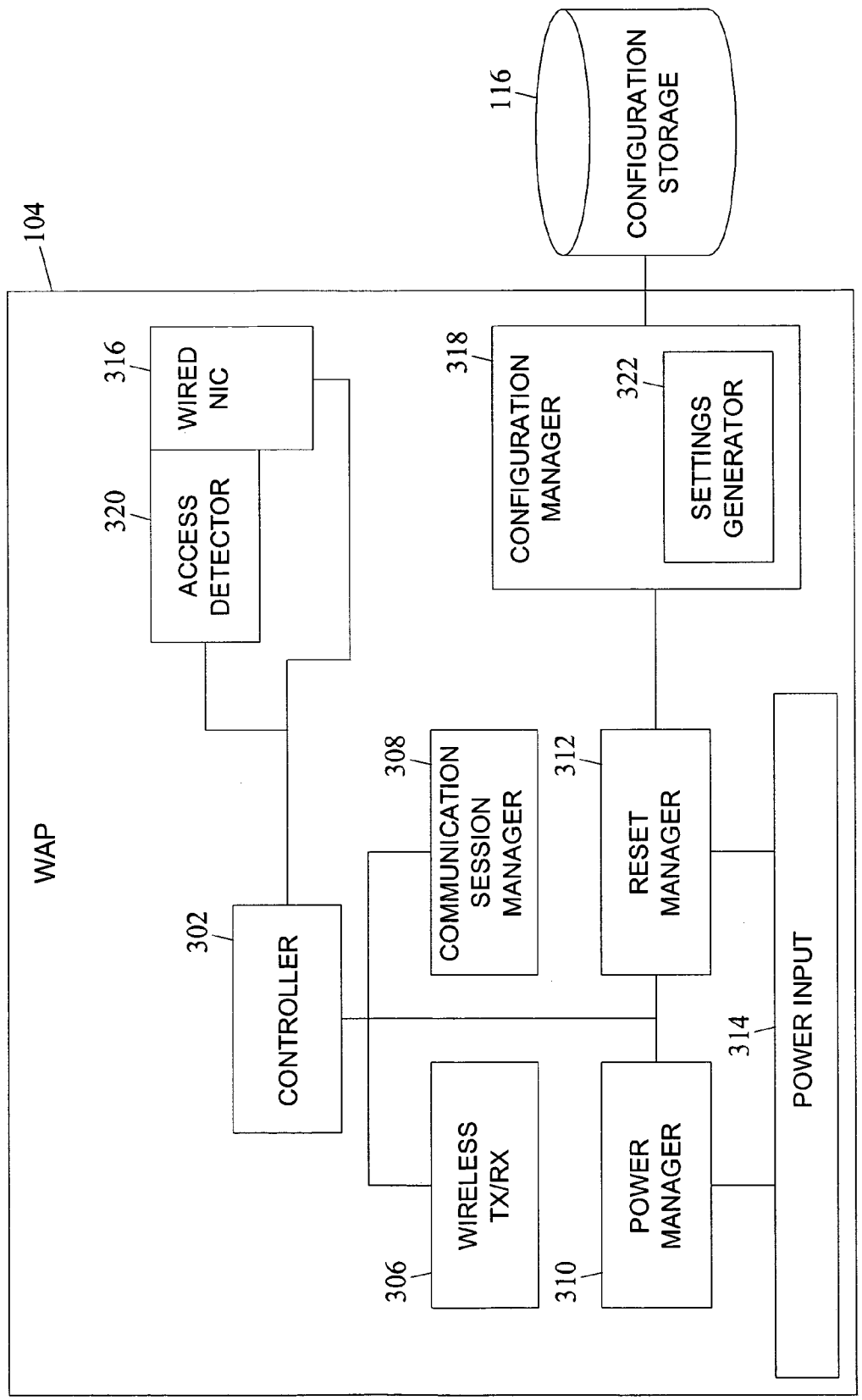
FIG. 3 is a block diagram of a WAP according to an embodiment of the subject matter described herein.

FIG. 3 illustrates a block diagram of WAP 104 according to an embodiment of the subject matter described herein. It should be understood that the various components illustrated in the figures represent logical components that are configured to perform the functionality described herein and may be implemented in software, hardware, or a combination of the two. Moreover, some of all of these logical components may be combined and some may be omitted altogether while still achieving the functionality described herein. Referring to FIG. 3, WAP 104 may include a controller 302, a wireless transceiver 306, a communication session manager 308, a power manager 310, a reset manager 312, and a power input 314. Controller 302 may control the overall operation of components of WAP 104. Further, controller 302 may be notified of one or more events by a component and signal one or more components in response to receiving the notification. Exemplary event triggers include a power switch, a signal from another device, a link request, and a link termination. Other exemplary event triggers include detection of access to a NIC, detection of a computer read/write media in a computer media writer, detection of an event from an audio device, detection of power to a display device (such as a computer display, projector, or the like), and an indication received via a control, such as a flip switch (e.g., light switch), a toggle button, or a switch. Controller 302, while shown and described as a separate component, may be incorporated in function into one or more of the other components shown in FIG. 3. Alternatively, one or more of the other components shown in FIG. 3 incorporated into controller 302.

Reset manager 312 may control and manage configuration information for enabling access by wired and wireless network-enabled devices by interoperating with other components. For example, reset manager 312 may be configured to provide configuration information generated by settings generator 322 and stored in configuration storage 116, which is managed by configuration manager 318, to signal wireless transceiver 306 and/or wired NIC 316 via controller 302 to transmit the configuration information to a network enabled device 106 and/or 108. The term "network interface," as used herein, refers generally to wireless transceiver 306 and/or wired NIC 316.

For example, reset manager 312 may be configured to receive a change configuration signal. Such a signal may be received via controller 302. A number of components may cause controller 302 to send this signal. For example, upon detection of power by power manager 310 received from power input 314, or a detection of a "wake-up" signal from controller 302, power manager 310 may send a signal to controller 302 indicating activation of the device which causes controller 302 to send the change configuration signal to reset manager 312.

In another example, wireless transceiver 306 and/or wired NIC 316 receive a first connection request after providing of the last network communication configuration information has been disabled. More particularly, controller 302 receives a signal indicating an access request that is determined by communication session manager 308 to be the first since deactivation of the wireless network using the last configuration in communication with controller 302. As a result, controller 302 sends a change configuration signal to reset manager 312, which responds in a manner similar to that just described.

Controller 302 may be configured to activate WAP 104 if WAP 104 is disabled based on, for example signals from access detector 320 via wired NIC 316, power manager 310, and wireless transceiver 306, in the depicted system. Operation is similar to that described for the change configuration process described above. When controller 302 receives a signal from any of the exemplary components listed where WAP 104 is not in a state allowing for communication via wireless network, controller 302 may send a change configuration signal to reset manager 312 as just described, and send an activate signal to wireless transceiver 306 and other components depending on the state of WAP 104 to place WAP 104 in a state where wireless network is configured with the network communication configuration information provided via reset manager 312. For example, if controller 302 receives a signal from access detector 320 indicating a first access after a disable operation, and wireless transceiver is not powered, controller 302 sends a message to power manger 310 enabling power to be supplied to wireless transceiver 306 prior to controller 302 sending an activate signal to wireless transceiver 306.

Further, controller 302 may be configured to provide network communication configuration information received from reset manager 312 interoperating with configuration manager 318 to network-enabled devices via transceiver 306 and wired NIC 316 when a first connection request is detected by transceiver 306 or wired NIC 316 after a wireless network using the last configuration has been disabled as previously described.

In alternative embodiments, module 302 may receive signals from components positioned outside of WAP 104 and coupled to WAP 104 via a communication link in order to enable module 302 to direct operations, including disabling wireless transceiver 306, waking WAP 104 from sleep mode using power manager 310, and generating new configuration information using reset manager 312.

For example, WAP 104 may be coupled with configuration writer 122 via an external wired connection such as USB or Ethernet. WAP 104 may receive a signal from configuration writer 122 when a computer read/write medium 124 is inserted. WAP 104 may detect the signal via a configuration writer driver component (not shown) included with WAP 104. The configuration writer driver may send a message to controller 104 associated with the signal. Controller 102, in this example, may send a signal to reset manager 312, which through interoperation with configuration manager 318 receives current network configuration information from configuration storage 116. Reset manager 312 returns the current network configuration information to the configuration writer driver through controller 102 with a signal to write the configuration information to the media 124 in configuration writer 122. In this example, communication session manager 308 provides information to controller 102 indicating that WAP 104 has ongoing communications sessions with one or more network enabled devices, thus the current configuration is provided. In a case where there were no ongoing sessions, the insertion of media 124 into configuration writer 122 may result in reset manager 312 receiving a change configuration signal as previously described, and appropriate signals may be sent to power manger 310 and wireless transceiver 306 for providing new configuration information as already described depending on the state of WAP 104. Other components may also be involved depending on the embodiment and state of WAP 104.

Further, transceiver 306 may be configured to disable the provision of network communication configuration information when a last one of network-enabled devices terminates its respective communication session. This may be enabled, for example, by transceiver 306 notifying controller 302 each time a session is terminated, aborted, or lost. Controller 302 may instruct communication session manager 308 to adjust a count of active sessions it tracks. Alternately, controller 302 may maintain the count and instruct communication session manager 308 to set a Boolean value that indicates active sessions or no active sessions based on the maintained count. In yet another embodiment, wireless transceiver 306 may maintain the count of active sessions. Transceiver 306 may be provided with new network communication configuration information when a last one of network-enabled devices terminates its respective communication session. As described in more detail below, network communication configuration information may be provided to transceiver 306 as a result of a change configuration signal received by reset manager 312. This process may be triggered by a number of possible events of which examples have been provided.

Communication session manager 308 may manage tracking activity of communication sessions of WAP 104. In particular, communication session manager 308 may determine whether WAP 104 is maintaining active communication sessions between a network and network-enabled devices. In one example, communication session manager 308 may maintain a count of active links. In another example, communication session manager 308 may maintain a Boolean flag for indicating that there is at least one active communication session. In another example, communication session manager 308 may maintain a timer and a set of access rules. In this example, the timer may be used in a policy to limit the duration of a particular communication session, such as a communication session having a particular communication configuration. Further, communication session manager 308 may maintain detailed information about each communication session, such as network-enabled device identification information, information about a user of a network-enabled device, and authorization information. Communication session manager 308 performs its function in the exemplary embodiment using information provided through controller 302 typically from wireless transceiver 306, but also may be affected by the operation of other components.

Power manager 310 may be configured to control power to components of WAP 102 as described above. Further, power manager 310 may be operable to disable power to transceiver 306 when a last one of network-enabled devices terminates its respective communication session. For example, controller 302 may instruct power manager 310 to disable wireless transceiver 306 when communication session manager 308 signals controller 302 that there are no active sessions. Power manager 310 may disable other components as well, for example, putting all components into a sleep state and leaving only wired NIC 316 configured to detect connection requests and signal access detector 320, which may signal power manager 310 to "wake-up" WAP 104. Further, power manager 310 may be configured to detect a power-up, and in response to the detection, provide power to and signal controller 302 and/or reset manager 312 to manage the generation of new network communication configuration information Reset manager 312 may coordinate disabling of communication sessions with a network using a current network configuration and obtain new network communication configuration information for the next activation of communication sessions with the network, in an alternate embodiment. Further, reset manager 312 may receive a change configurations signal from controller 302 in response to a signal received from communication session manager 308, power manager 310, and/or access detector 320. Reset manager 312 may manage power and communication session enablement via controller 302, transceiver 306, and/or power manager 310. Further, reset manager 312 may control configuration manager 318 to generate, maintain, and provide network communication configuration information for distribution. In a preferred embodiment, controller 302 performs the coordination functions described.

Wired NIC 316 may provide wired network access to network-enabled devices. Further, wired NIC 316 may provide network communication configuration information to network-enabled devices, as previously mentioned. An access detector 320 may be configured to detect the presence of network-enabled devices attempting communication with wired NIC 316. Detecting the presence of network-enabled devices attempting communication with wired NIC 316 may include monitoring memory associated with wired NIC 316 for the presence of packets or frames that contain connection setup information. In response to detecting the presence of network-enabled devices attempting communication with wired NIC 320, detector 320 may signal controller 302 to activate network communication via wireless transceiver 306, if network communication is not already activated, and establish a communication session with a detected network-enabled device by providing network configuration information for the wireless network to the network-enabled device connected through wired NIC 316. If WAP 104 is actively providing a wireless network to another network-enabled device, a network-enabled device connecting through wired NIC 316 detected by access detector 320 is provided with the current network configuration information for allowing it to join the current network.

In FIG. 3, access detector 320 is coupled to wired NIC 316. Alternatively, access detector 320 or analogs may be connected to other suitable components for communicating information regarding the presence of network-enabled devices attempting communication with WAP 104. Exemplary components that may be used to indicate the presence of network-enabled devices attempting communication with WAP 104 include media writers, displays associated with WAP 104, audio players, and wireless proximity networks provided by or coupled to WAP 104.

Configuration manager 318 may store network communication configuration information and manage generation of new network communication configuration information. Further, configuration manager 318 may request data for generating new network communication configuration information and receive the data from components of WAP 104. A settings generator 322 may generate new network communication configuration information. For example, setting generator 322 may use a random character generator to generate SSIDs and shared keys each conforming to length and valid character constraints known to settings generator 322.

As stated above, current network communication configuration information may be stored at configuration storage 116 accessible by WAP 104. Configuration storage 116 may include volatile and persistent storage. Further, configuration storage 116 may store data used by settings generator 322 for generating network communication configuration information such as a seed for a random character generator. Configuration storage 116 may store network communication configuration information persistently so that the information survives a WAP power down. Configuration storage 116 may be included in WAP 104 or may be external and communicatively coupled to WAP 104.

Figure 4:
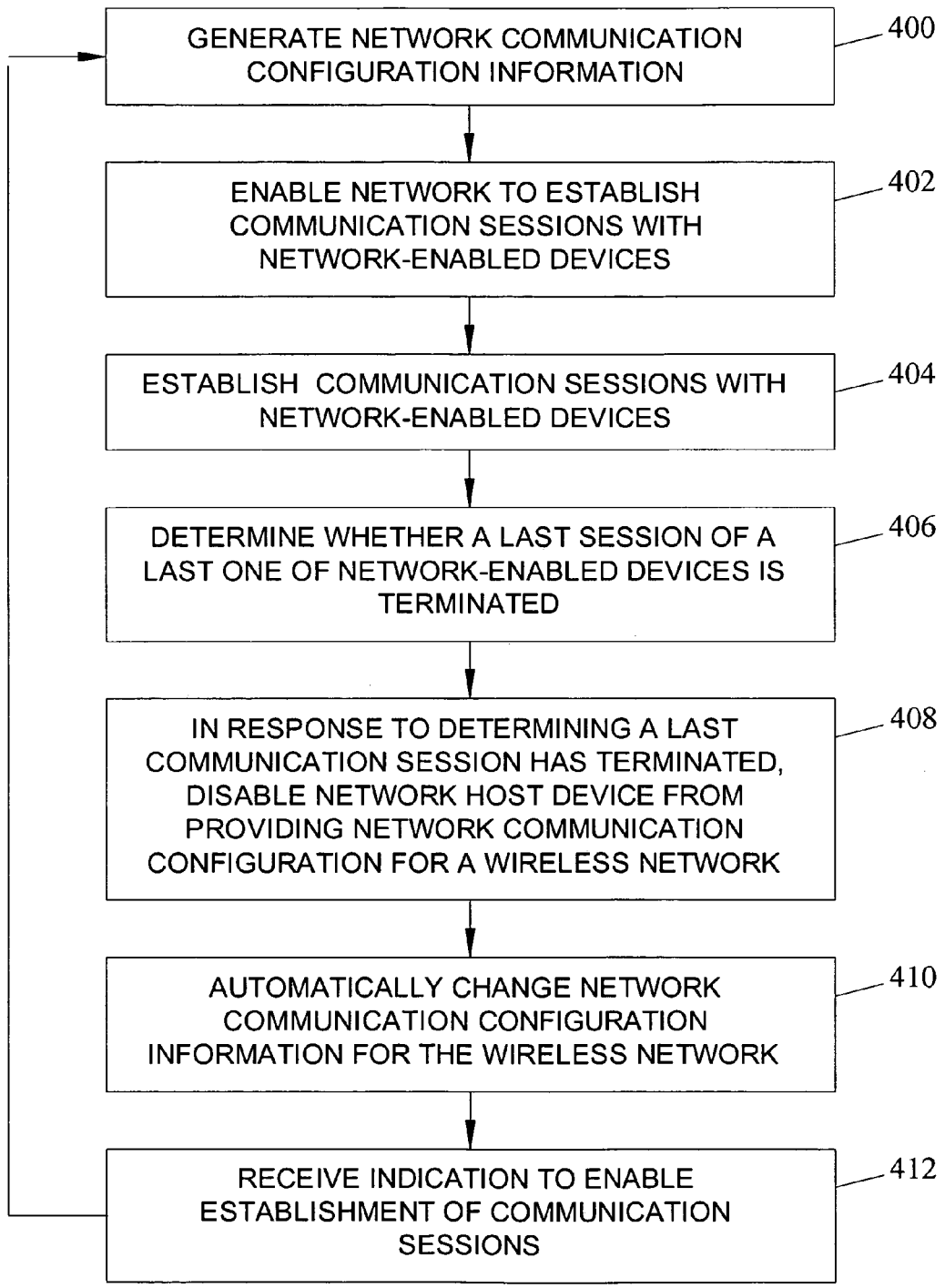
FIG. 4 is a flow chart illustrating an exemplary process for use by a WAP for automatically changing network communication configuration information when a communication session is terminated according to an embodiment of the subject matter described herein.

FIG. 4 is a flow chart illustrating an exemplary process for use by WAP 104 shown in FIGS. 1 and 3 for automatically changing network communication configuration information when a communication session is terminated according to an embodiment of the subject matter described herein. Referring to FIG. 4, network communication configuration information may be generated (block 400). A settings generator 322 of configuration manager 318 may generate new network communication configuration information. The generated network communication configuration information may be stored in configuration storage 116.

In block 402, a network may be enabled to establish communication sessions with network-enabled devices. Communication sessions with network-enabled devices 106 and 108 may be established by enabling WAP 104 to initiate providing of network communication configuration information for wireless network to network-enabled devices 106 and 108. The communication sessions with the wireless network may be established via WAP 104. WAP 104 may include means for enabling the initiation of providing of network communication configuration information for a network to at least one network-enabled device for establishing a communication session with the network via WAP 104. For example, controller 302 may enable WAP 104 to initiate providing of network communication configuration information obtained via reset manager 312 for wireless network 102 to network-enabled devices 106 and 108 for establishing communication sessions via wireless network 102 via WAP 104.

Configuration manager 318 may communicate network communication configuration information to transceiver 306 and/or wired NIC 316 as described earlier for communication of the configuration information to network-enabled devices 106 and 108. In one example, wired NIC 316 may communicate the configuration information to NIC 118 of network-enabled device 106 via Ethernet 110 and switch/hub 120. In another example, transceiver 306 may wirelessly communicate the configuration information to network-enabled device 108. In another example, the configuration information may be communicated to network-enabled devices by a removable computer read/write medium 124 having the configuration information stored thereon by configuration writer 122 in communication with WAP 104. In this example, a user may obtain the computer read/write medium 124 and interface computer read/write medium 124 with media reader 126 for reading by network-enabled device 108. In another example, the configuration information may be communicated to a network-enabled device when the network-enabled device is positioned in a guest area. In this example, a short-range wireless communication technology, such as Bluetooth™ wireless technology, may be utilized for communicating the network communication configuration information to the network-enabled device. In another example, the configuration information may be communicated via infrared signaling techniques.

In block 404, communication sessions with network-enabled devices may be established. Network-enabled devices 106 and 108 may utilize the network communication configuration information for establishing respective communication sessions with wireless network. For example, network-enabled devices 106 and 108 may utilize an SSID in communications with WAP 104. Further, for example, network-enabled devices 106 and 108 may utilize a shared key for as a passphrase for authorizing communication with WAP 104. WAP 104 may verify communications from network-enabled devices 106 and 108 by checking configuration information provided in the communications. If verification is employed, communication sessions may be established for network-enabled devices 106 and 108 when the provided configuration information is verified.

In block 406, WAP 104 may determine whether a last session of a last one of network-enabled devices is terminated. WAP 104 may include means for determining when a last session of a last one of network-enabled devices is terminated. For example, communication session manager 308 may determine when a last session of a last one of network-enabled devices is terminated. As stated above, communication session manager 308 may determine whether WAP 104 is maintaining active communication sessions between a network and network-enabled devices. In one example, communication session manager 308 may maintain a Boolean flag for indicating that there is at least one active communication session. In another example, communication session manager 308 may maintain a count of active links. When a last session of a last one of network-enabled devices terminates, communication session manager 308 may notify one or more other components of WAP 104 of the condition.

In block 408, WAP 104 may be disabled from providing network communication configuration information for wireless network 102 in response to determining a last communication session has terminated. WAP 104 may include means for disabling itself from providing network communication configuration information in response to a last session of a last one of one or more network-enabled devices terminating. For example, communication session manager 308 may signal controller 302, which may disable or terminate the communication session by a network-enabled device. In another example, a communication session may be terminated based on a security setting, such as a maximum link time allowed. In another example, a communication session may be terminated by an error condition detected by WAP 104.

WAP 104 may be disabled from providing network communication configuration information by communication session manager 308 instructing controller 302 that a last session of a last one of the at least one of the at least one network-enabled devices has terminated. In response, controller 302 sends a signal to put transceiver 306 and/or wired NIC 316 in a disabled state. The signal may be sent directly or indirectly via another component. Alternatively or additionally, WAP 104 may be disabled by communication session manager 308 by sending a last session signal to controller 302, which may respond by sending a signal to power manager 310 to shut down non-essential components of WAP 104 associated with providing network communication or all components of WAP 104. Controller's 302 response to the last session signal depends on the embodiment and may depend on the state of WAP 104 in some embodiments.

In block 410, WAP 104 may automatically change network communication configuration information for wireless network 102. WAP 104 may include means for automatically changing network communication configuration information in response to determining a last communication session has terminated. For example, settings generator 322 of configuration manager 318 may generate changed network communication configuration information in response to a configuration change signal from controller 302 as discussed earlier. In one example, settings generator 322 may generate random SSID characters for use in the changed network communication configuration information. In another example, settings generator 322 may generate random shared key characters for use in the changed network communication configuration information. A character is any valid data element allowed for the configuration item, such as an SSID or shared key, by the embodiment, typically including alphanumeric characters and may be case sensitive in some embodiments for some configuration items. In another example, a userid and password for accessing the network may be changed, e.g., generated anew, by settings generator 322.

A change in network communication configuration information may be initiated, in one embodiment, by communication sessions manager 308 sending a last session signal to controller 302, which sends a change configuration signal to reset manager 312. Reset manager 312 interacts with configuration manager 318 to generate new network communication configuration information using settings generator 322. In an alternate embodiment in which WAP 104 has been enabled, new network communication configuration information is generated in response to power manager 310 receiving power and activating WAP 104. In this embodiment power manager 310 sends a change configuration signal to reset manager 312, which generates new configuration information.

In block 412, WAP 104 may receive indication to enable establishment of one or more communication sessions. For example, an indication to enable establishment of a communication session may occur when a power-on event is detected for WAP 104. In this example, a power-on event may be triggered when access detector 320 detects an attempt to access via wired NIC 316 while WAP 104 is in a sleep state. Access detector 320 may detect the access attempt and notify power manager 310 via controller 302 to initiate a wake-up process for WAP 104 waking or booting components depicted which are not already active. In another example, proximity network transceiver (not shown) such as an infrared transceiver may identify network access attempts and notify power manager 310 via controller 302 to initiate a power-up/wake-up process for WAP 104 waking or booting components depicted which are not already active. Further, configuration writer 122 may send a signal to a configuration writer driver (not shown) of WAP 104 when computer read/write medium 124 is inserted. Configuration writer driver may send a writer ready signal to controller 302, which sends a power-up/wake-up signal to power manager 310 via controller 302 in a process analogous to those described above for access via wired NIC 316 and proximity network transceiver 310. In one example, configuration information may be displayed near a network-enabled device or on a display communicatively coupled to WAP 104. Power on of the display may be detected by a display driver (not shown) associated with WAP 104 triggering enablement of WAP 104 via signaling power manager 310, as in previous examples. Enablement of an audio device coupled to WAP 104 may similarly result in enablement of WAP 104 and the providing of configuration information to users and/or devices via an audio signal.

In another example, network host device and network-enabled device may receive an indication to enter a configuration mode and the devices may attempt an exchange of configuration information for establishing a communication session, for example using a configuration protocol such as SES.

After block 412, the process may return to block 402 for enabling wireless network to establish communication sessions with a new network-enabled device. The steps illustrated in FIG. 4 may be performed continually to establish and disable communications with multiple groups of network-enabled devices.

According to one embodiment of the subject matter described herein, a "black list" and/or "grey list" of network-enabled devices and/or users may be maintained by a network host device. Devices and users listed in the black list are never allowed network connectivity via network host device even if proper network communication configuration information is provided. Devices and users listed in the grey list may be provided network access only when other defined devices or users are connected to the network.

According to another embodiment of the subject matter described herein, a network may not activate unless connection is made to a known network-enabled device or user. A list may be maintained in the network host device of known network-enabled devices and users. After deactivation of the network, re-activation may only occur when a device or user identified in the list attempts a connection to the network host device. Further, network access may be disabled when the communication session of the last known device or user is terminated.

According to another embodiment of the subject matter described herein, a firewall may be maintained between predetermined devices or users and guest devices for preventing guests from accessing protected components of a network. For example, a firewall may be maintained between predetermined devices including employee or company devices and guests to the network.

According to another embodiment, other access protocols and tools may be used to further enhance security and protect network resources including protocol 802.1x and a radius server.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for automatically changing network communication configuration information when a last communication session is terminated, the method comprising:
   enabling a network host device to provide common network communication configuration information for a network to each of a plurality of network-enabled devices for establishing a plurality of communication sessions via the network;
   determining when a last one of the plurality of communication sessions is terminated of a last one of the plurality of network-enabled devices; and
   in response to determining the last one of the plurality of communication sessions is terminated:
      disabling the network host device from providing the network communication configuration information; and
      automatically changing the network communication configuration information for the network.

2. The method of claim 1 wherein enabling a network host device to initiate providing of network communication configuration information for a network includes one of enabling a wireless access point (WAP) to initiate providing of network communication configuration information for the network, enabling a wireless network base station to initiate providing of network communication configuration information for the network, and enabling a wired network access point to initiate providing of network communication configuration information for the network.

3. The method of claim 1 wherein enabling a network host device to initiate providing of network communication configuration information includes enabling the network host device to initiate providing of at least one of a service set identifier (SSID) and a network key.

4. The method of claim 1 wherein enabling a network host device to initiate providing of network communication configuration information for a network to at least one network-enabled device includes enabling the network host device to initiate providing of network communication configuration information for the network to one of a mobile phone, a personal digital assistant (PDA), a media capture device, a projector, a display device, a media player device, a sensor device, an appliance, a transportation device, and a computer.

5. The method of claim 1 wherein determining when a last session is terminated of a last one of the at least one network-enabled device includes determining whether a time elapsed since a latest communication between the network host device and the at least one network-enabled device exceeds a predetermined time period, and wherein the method further comprises terminating communication sessions between the network host device and the at least one network-enabled device in response to determining that the elapsed time exceeds the predetermined time period.

6. The method of claim 1 wherein determining when a last session is terminated of a last one of the at least one network-enabled device includes counting a number of communication sessions between the network host device and the at least one network-enabled device, and determining when the number of communication sessions is zero.

7. The method of claim 1 wherein automatically changing the network communication configuration information for the network includes generating random service set identifier (SSID) characters for use in the changed network communication configuration information.

8. The method of claim 1 wherein automatically changing the network communication configuration information for the network includes generating random shared key characters for use in the changed network communication configuration information.

9. The method of claim 1 wherein automatically changing the network communication configuration information for the network includes at least one of changing a userid and changing a password for accessing the network for communication via the network.

10. The method of claim 1 comprising detecting a power-on or wake-up event for the network host device, and wherein enabling a network host device to initiate providing of network communication configuration information includes enabling the network host device to initiate providing of network communication configuration information in response to detecting the power-on event.

11. The method of claim 1 comprising detecting a communication session attempt to the host network device by one of the at least one network-enabled device, and wherein enabling a network host device to initiate providing of network communication configuration information includes enabling the network host device to initiate providing of network communication configuration information in response to detecting the communication session attempt to the host network device.

12. The method of claim 1 comprising detecting an event from one of a media reader/writer, a display device, and an audio device, and wherein enabling a network host device to initiate providing of network communication configuration information includes enabling the network host device to initiate providing of network communication configuration information in response to detecting the event from one of the media writer, the display device, and the audio device.

13. The method of claim 1 wherein disabling the network host device from providing network communication configuration information for the network includes deactivating wireless communications of the network host device.

14. The method of claim 1 wherein disabling the network host device from providing network communication configuration information for the network includes at least one of limiting and preventing the flow of power to at least a portion of components of the network host device.

15. A system for automatically changing network communication configuration information when a last communication session is terminated, the system comprising:
a network interface configured to provide common network communication configuration information for a network to each of a plurality of network-enabled devices for establishing a plurality of communication sessions via the network;
a communication session manager configured to determine whether a last one of the plurality of communication sessions via the network of a last one of at least one network-enabled device is terminated; and
a configuration manager configured to, in response to the communication session manager determining the last one of the plurality of communication sessions is terminated, change the network communication configuration information for the network provided by the network interface.

16. The system of claim 15 wherein the system is configured to enable a wireless access point (WAP), a wireless network base station, or a wired network access point to provide network communication configuration information for the network.

17. The system of claim 15 wherein the network interface includes at least one of a wireless transceiver and a wired network interface card.

18. The system of claim 15 wherein the network interface is configured to provide the network communication configuration information for the network to one of a mobile phone, a personal digital assistant (PDA), a media capture device, a projector, a display device, a media player device, a sensor device, an appliance, a transportation device, and a computer.

19. The system of claim 15 wherein the communication session manager is configured to determine whether a time elapsed since a latest communication session with the at least one network-enabled device exceeds a predetermined time period, and wherein the communication session manager is configured to determine that a communication session with the at least one network-enabled device is terminated in response to determining that the elapsed time exceeds a predetermined time period.

20. The system of claim 15 wherein the communication session manager is configured to count a number of communication sessions with the at least one network-enabled device, and the communication session manager is configured to determine that a communication session with the at least one network-enabled device is terminated when the number of communication sessions is zero.

21. The system of claim 15 wherein the configuration manager is configured to generate random service set identifier (SSID) characters or digits for use in the changed network communication configuration information.

22. The system of claim 15 wherein the configuration manager is configured to generate random network key characters or digits for use in the changed network communication configuration information.

23. The system of claim 15 wherein the configuration manager is configured to generate at least one of a userid and a password for accessing the network for communication via the network.

24. The system of claim 15 comprising a power manager configured to detect a power-on event for the system, and wherein the configuration manager is configured to enable the network interface to initiate providing of network communication configuration information in response to the power manager detecting the power-on event.

25. The system of claim 15 wherein the communication session manager is configured to detect a communication session attempt to the network interface by one of the at least one network-enabled devices, and wherein the configuration manager is configured to enable the network interface to initiate providing of the network communication configuration information in response to detecting the communication session attempt.

26. The system of claim 15 wherein the communication session manager is configured to detect an event from one of a media reader/writer, a display device, and an audio device, and wherein the configuration manager is configured to enable the network interface to initiate providing of the network communication configuration information in response to detecting the event from one of the media reader/writer, the display device, and the audio device.

27. The system of claim 15 comprising a reset manager configured to deactivate wireless communications by the network interface in response to the communication session manager determining that a last communication session of a last one of the at least one network-enabled device is terminated.

28. The system of claim 15 wherein the configuration manager is operable to power down the network host device in response to the last one of the at least one network-enabled device terminating its respective communication session.

29. A system for automatically changing network communication configuration information when a last communication session is terminated, the method comprising:
means for enabling a network host device to provide common network communication configuration information for a network to each of a plurality of network-enabled devices for establishing a plurality of communication sessions via the network;
means for determining when a last one of the plurality of communication sessions is terminated of a last one of the plurality of network-enabled devices; and
means for disabling the network host device from providing the network communication configuration information in response to the last one of the plurality of communication sessions being terminated; and
means for automatically changing the network communication configuration information for the network in response to the last one of the plurality of communication sessions being terminated.

30. A computer program product comprising computer executable instructions embodied in a computer readable medium for performing steps when executed by a computer, the steps comprising:
enabling a network host device to provide common network communication configuration information for a network to each of a plurality of network-enabled devices for establishing a plurality of communication sessions via the network;
determining when a last one of the plurality of communication sessions is terminated of a last one of the plurality of network-enabled devices; and
in response to determining the last one of the plurality of communication sessions is terminated:
disabling the network host device from providing the network communication configuration information; and
automatically changing the network communication configuration information for the network.

* * * * *